R. E. L. JANNEY.
COUPLING LOCK.
APPLICATION FILED JULY 31, 1912.

1,100,078.

Patented June 16, 1914.
2 SHEETS—SHEET 1.

Witnesses:

Inventor:
Robert E. Janney

R. E. L. JANNEY.
COUPLING LOCK.
APPLICATION FILED JULY 31, 1912.

1,100,078.

Patented June 16, 1914.
2 SHEETS—SHEET 2.

Witnesses:

Inventor:
Robert E. L. Janney

UNITED STATES PATENT OFFICE.

ROBERT E. L. JANNEY, OF CHICAGO, ILLINOIS, ASSIGNOR TO AMERICAN STEEL FOUNDRIES, OF NEW YORK, N. Y., A CORPORATION OF NEW JERSEY.

COUPLING-LOCK.

1,100,078.  Specification of Letters Patent.  Patented June 16, 1914.

Application filed July 31, 1912. Serial No. 712,395.

*To all whom it may concern:*

Be it known that I, ROBERT E. L. JANNEY, a citizen of the United States, and resident of Chicago, in the county of Cook and State of Illinois, have invented certain new and useful Improvements in Coupler-Locks, of which the following is a specification.

My inventon relates to car couplers and has particular reference to a novel coupler lock and the mounting therefor within the coupler head.

In the operation of railway trains and particularly freight trains the couplers joining the adjacent cars are given hard usage with the result that the working parts wear and become loose. The wear is most apparent in the coupler knuckle; that is, the hook which engages the hook of the mating coupler. This wear appears in the pivot pin, the locking face of the knuckle, the lock and the locking face of the coupler. As this wear increases the knuckle is allowed to open beyond normal lines to a certain extent. When this abnormal opening reaches a certain point the coupler becomes unserviceable and must be discarded, this for the reason that there is a tendency for the coupler to become disconnected from the mating coupler if the knuckle does not remain closed to its full extent. This is a frequent cause of trains becoming parted while in motion.

The present invention relates to a coupler so arranged that this wear is automatically taken up.
I am aware that wedge locks have heretofore been suggested for the purpose of taking up this wear, but the tendency of these locks is to become tightly wedged in service and therefore difficult of removal. By the arrangement of the present application the tendency of the lock is not to become so tightly wedged and which will nevertheless automatically take up any lost motion due to wear of the moving parts.
It will also be evident that by my improved construction I provide for full bearing surface on the wall side of the coupler in case of coupling on curves which will not permit the full closing of the knuckle. This is important as couplers are frequently broken by insufficient bearing for a short time.

Figure 1:
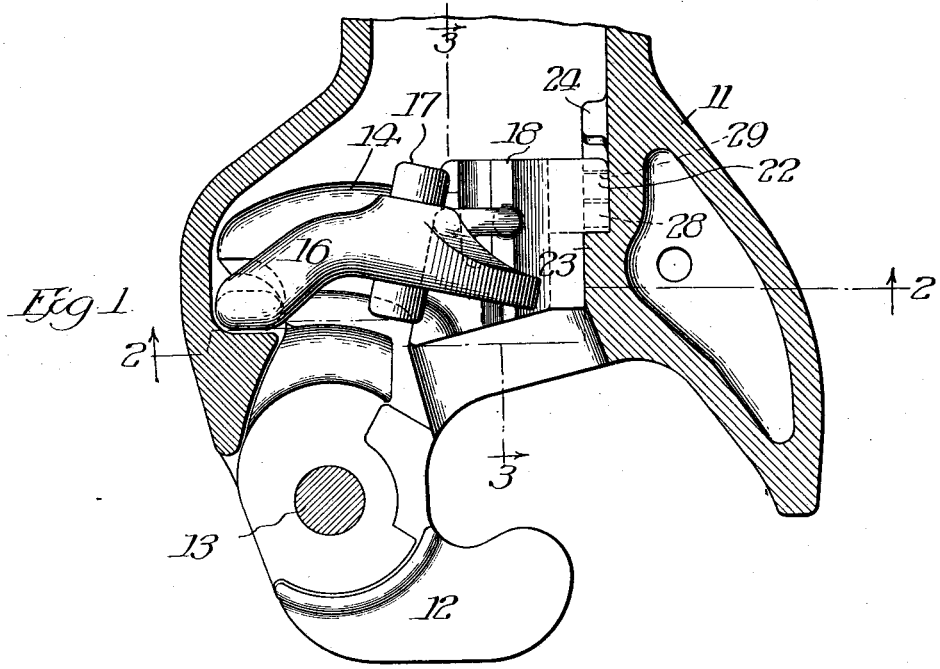
Figure 2:
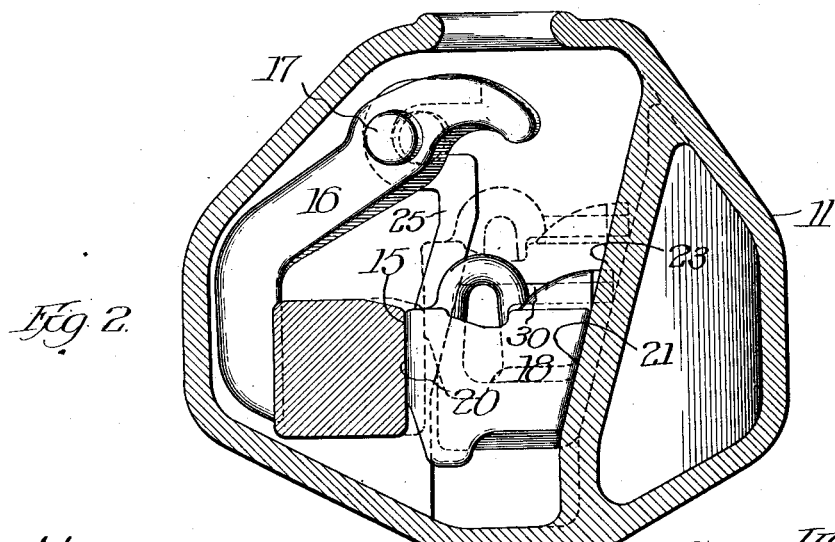
Figure 3:
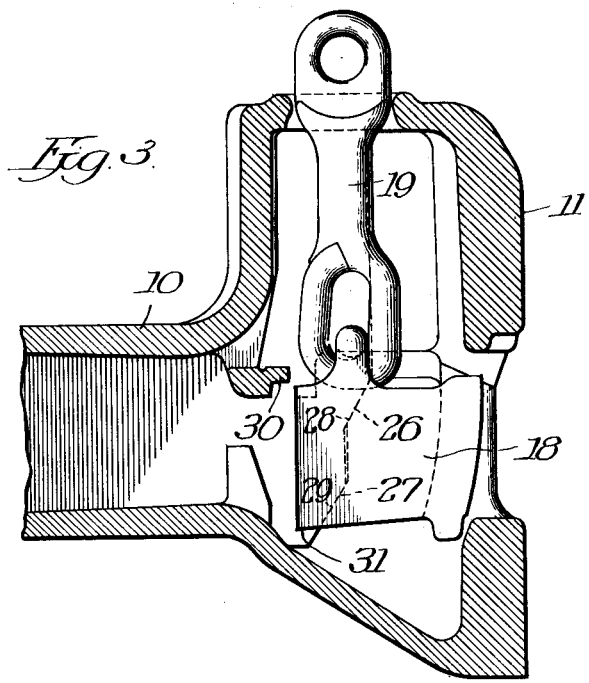
Figure 4:
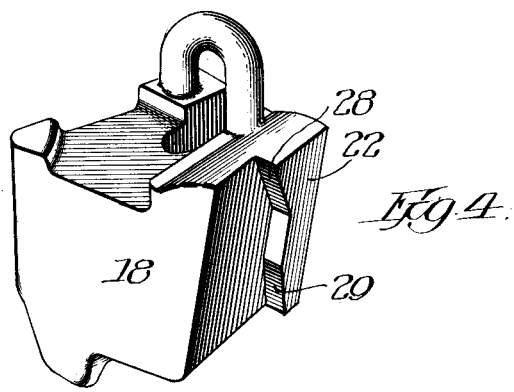

The invention will be more readily understood by reference to the drawings, wherein, Figure 1 is a sectional plan view of a coupler constructed in accordance with my invention; Fig. 2 is a vertical section on the line 2—2 of Fig. 1; Fig. 3 is a section on the line 3—3 of Fig. 1; and, Fig. 4 is a perspective view of the lock of my invention.

Referring more particularly to the drawings it will be seen that the coupler is of the well known Janney type and is composed of a shank 10, a head 11, and a knuckle 12. The knuckle is pivoted to the head by means of a pin 13. The knuckle is provided with a tail 14, having a locking face 15. A knuckle thrower 16, provided with trunnions 17, is pivoted within the head and is adapted to be actuated by the lock for the purpose of throwing the knuckle. Inasmuch as this element forms no part of my invention I do not deem it necessary to describe the same or its action in detail.

The lock 18 is mounted within the coupler head and is adapted to be lifted by means of a link 19 projecting through the top wall of the coupler. This lock is provided with a vertical locking face 20, adapted to contact the locking face 15 of the knuckle tail while on its opposite side the locking surface 21 is inclined. On this face as shown in Fig. 4, is provided a projection or rib 22, which projection normally occupies the space between the guides 23, 24.

As shown in Fig. 2, the wall of the coupler which provides the locking face for the locking block and the guides 23, 24, is inclined toward the lower central portion of the coupler body. In order to assure the retention of the lock in place a further guide 25 is provided for the opposite side of the locking block 18, this guide being likewise inclined at the same angle as the guides 23, 24. The lower portion of the guide 23, as shown in dotted lines in Fig. 3, is stepped downward at 26, 27, thus providing a pair of inclined seats. These correspond to similar inclinations 28, 29 on the projection 22 of the coupler lock 18 and serve to cause the seating of the lock under the anti-creeping ledge 30, formed integral with the coupler head. This ledge 30 also serves as a lockset, the point 31 of the lock seating on the ledge when lifted. It will be seen by reference to Fig. 3, that the lock is lifted to the rear of its center of gravity which tends to throw the point 31 inward and seat it on the lockset when the point is raised thereabove. It will be seen in the position of

Fig. 3 that if the lock begins to creep its tendency will be to rock; that is, the creeping action begins at the forward or nose portion and as the lock is rocked, the upper left-hand corner, as viewed in Fig. 3, will project under the ledge 30 and prevent any upward movement of the lock. By the construction described, it will be seen that the tendency of the lock is to tightly wedge the knuckle in closed position and that notwithstanding this wedging action, the lock may be lifted easily in a slightly angular path to free it from the knuckle. It will be noted also that a coupler constructed in accordance with this invention may be mated with other couplers on sidings or curves and at the same time provide a full bearing on the coupler head in the event of the lock being caught on its way to the bottom, in the locking action of the coupler. As heretofore stated, it is not uncommon for the lock to be caught without being fully closed, due to back-lash of the knuckle and to seat in this position for some length of time. This results frequently in breakage due to the fact that there is only a small bearing surface on the coupler wall. Furthermore, when the lock is caught on its way to its seat if a full bearing is not provided on the coupler wall the tendency of the lock is to be angularly displaced or twisted. This very often results in the breaking of the lifter or lifting links. The lock caught in a midway position is shown in dotted lines in Fig. 2. My arrangement compensates or provides for back-lash giving full bearing surface at such times.

It will be obvious that many modifications may be made and such modifications as are within the scope of my claims I consider within the spirit of my invention.

I claim:

1. In a car coupler, the combination of a head and a knuckle pivoted therein, a wedge-shaped lock within said head, a vertically inclined guide in said head, said lock and guide coöperating to maintain said lock in engagement with the locking face of the head in positions other than the normal locking position of the lock, substantially as described.

2. In a car coupler, the combination of a head and a knuckle pivoted therein, a wedge-shaped lock, an inclined lock guide within said head, said guide extending substantially parallel with the locking face of the coupler, said lock and guide coöperating to maintain said lock in proximity to said locking surface in positions of said lock other than normal locking position, substantially as described.

3. In a car coupler, the combination of a head and a knuckle pivoted therein, said knuckle having a substantially vertical locking face, a wedge-shaped lock within said head, said head being provided with a vertically inclined locking face, and guiding means located within said head and arranged at an angle to the vertical whereby said lock may be moved in a path substantially parallel with and maintained in proximity to the head locking face, substantially as described.

ROBERT E. L. JANNEY.

Witnesses:
A. TREVOR JONES,
ELIZABETH LAMB.

Copies of this patent may be obtained for five cents each, by addressing the "Commissioner of Patents, Washington, D. C."